April 3, 1951
H. O. BAILEY
2,547,731
LIQUID LEVEL GAUGE VIEWING DEVICE
Filed Jan. 20, 1948
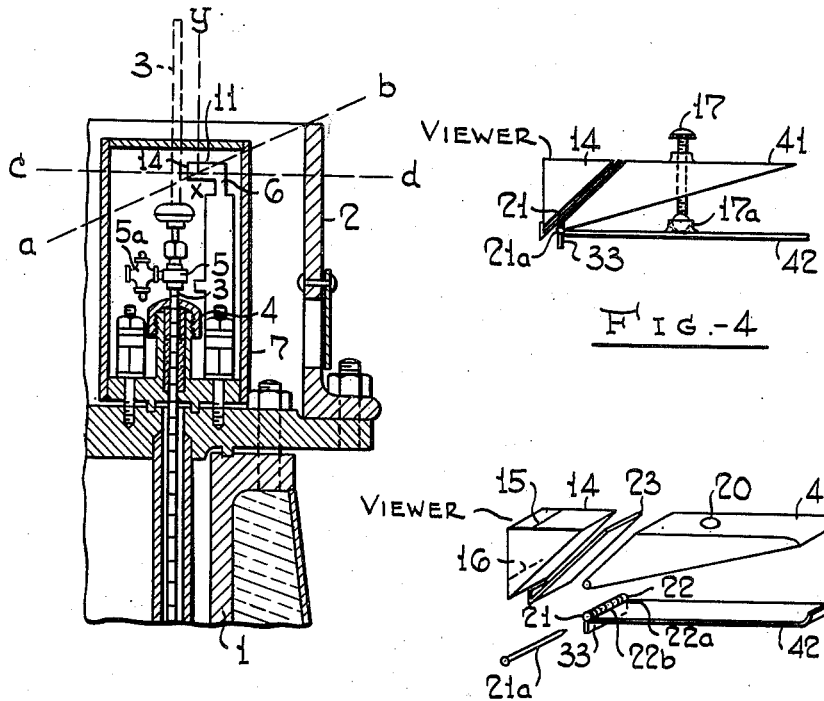
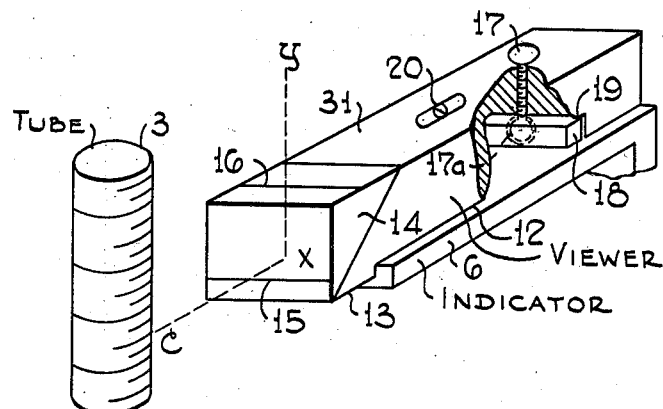
Herbert O. Bailey  Inventor
By W. O. T. Heilman  Attorney Patented Apr. 3, 1951

2,547,731

UNITED STATES PATENT OFFICE 2,547,731

LIQUID LEVEL GAUGE VIEWING DEVICE

Herbert O. Bailey, Springfield, N. J., assignor to Standard Oil Development Company, a corporation of Delaware Application January 20, 1948, Serial No. 3,270

3 Claims. (Cl. 73—298)

The present invention relates to a means for eliminating errors in gauging liquid levels, particularly when reading a gauge scale with reference to a pointer element disposed in substantially right angular relation thereto, and when circumstances prevent viewing of the scale by sighting along the indicator in substantially the same plane therewith. Frequently, as in tank car installations, limited space available for gauging, and other equipment permanently installed, makes such gauging means quite inaccessible. Under such conditions it is especially difficult properly to sight on gauges and gauge pointers to obtain accurate readings. It is an object of this invention, therefore, to provide a gauge scale viewing and reading means whereby an accurately sighted reading may be obtained in spite of the inaccessible location of a scale and pointer. It is a particular object of the invention to provide such means for use in conjunction with the vertically adjustable, scaled gauge tube and fixed pointer element ordinarily installed in the dome of a pressurized tank car, to obtain a reading not subject to parallax error caused by inability of the gauger to properly sight on the gauge tube scale in substantially the plane of the fixed pointer element.

The invention and its objects may be more readily understood from the following description, when read in conjunction with the accompanying drawings, in which:

Fig. 1 is a view, partly in section, through a portion of a tank car dome and shell.

Fig. 2 is a perspective view of one form of the device with parts broken away, and with reference to a scale and indicator.

Fig. 3 is an exploded perspective view of an alternate form of the device.

Fig. 4 is a side elevation of a portion of the device of Fig. 3, with parts broken away to show a level adjusting means therefor.

In the drawings, like parts are indicated by the same numerals. Referring specifically to Fig. 1 the numeral 1 designates a tank car shell, on which is imposed a dome 2. A gauge rod or tube 3 extends downwardly through the bottom of the dome into the interior of the shell, as through a packing gland 4. The upper end of the tube is provided with a valve member 5 having a petcock 5a. Adjacent the gauge tube 3 is disposed a fixed pointer element 6. The gauge tube 3 and pointer 6 are normally enclosed as by a removable housing 7.

In the ordinary operation or use of such means to gauge the level of a liquid, held under pressure in the tank car shell, the housing is removed, and the tube 3 is raised through the packing gland to a point above the liquid level in the shell as illustrated by dotted lines in Fig. 1. The valve 5 is then opened, and also the petcock 5a. The tube is then again lowered gradually until liquid is expelled from the petcock. At this point a reading of a scale on the tube is to be taken at a point opposite the forward end of the pointer 6. The scale on the tube 3 is so calibrated as to thus indicate the height of the liquid level, and on such basis the contents of the car shell.

As shown, the pointer 6 is usually somewhat below the level of the top of the dome 2 so that it is not possible to obtain a level sight, in the same plane as the pointer, on the tube scale. The dotted line $a—b$ shows the line of sight possible under the circumstances as compared with the line of sight required for an accurate reading, and indicated by the dotted line $c—d$. The viewing device 11, shown in position, on the pointer 6, is designed to provide a line of sight which, by reflection through a prismatic reflector element 14, permits interception of the true sight line $c—d$ at $x$ in such manner that it may be viewed at $y$ without interference of the dome 2 or other structural parts.

In its simplest form and as illustrated in Fig. 2, the viewer consists of a body member 31, having a base portion 12, from the forward end of which depends a stop member or portion 13 adapted for engagement with the forward end of the pointer 6. The forward end of the body 31 is adapted to receive the reflecting base of a prismatic reflector element 14 and hold it at substantially a 45° angle to the true line of sight $c—d$, the element 14 being of right isosceles triangular cross-section. In order to permit use of the device with existing gauge tube and pointer structures, the reflector 14 is mounted so as to extend below the base 12, so that the exact point of interception of the true line of sight may be well within the reflective base surface of the reflector element. Also, the reflector element is so mounted on the forward end of the body member that, in the absence of displacement of either the gauge tube 3 or pointer element 6, the forward side surface of the element 6 normally will be in parallel relation to the tube, and the other or upper surface in vertical or right angular relation thereto. In Fig. 2, the relationship and arrangement of parts are further illustrated, as are aligned sighting indicia 15 and 16 provided on the exterior surfaces of the reflector element 14.

These indicia, such as cross-hairs etched or otherwise imposed, provide the means whereby the 45° angle of interception of the true line of sight c—d may be accurately determined in use. In accordance with known principles, the crosshair on the upper surface of the reflector element, should be spaced from the apex edge of the right isosceles element 14, a distance exactly equal to the distance by which the cross-hair on the forward side surface of the element is spaced from the lower base angle edge of that side. In mounting the reflector element, it should be positioned so that the latter cross-hair may lie in the normal plane of the body member base portion.

Inasmuch as in service the gauge tube 3 or other scaled element, or the indicator element 6 may be displaced from their normal relationship, as illustrated in Fig. 2, adjusting means 17 is provided whereby the cross-hairs may be brought into proper alignment, with the line of sight c—d so that the cross-hair 15 lies in the plane of such line of sight, and the cross-hair 16 lies in a plane perpendicular thereto, and substantially parallel to the front surface of the reflector element. The means 17, as shown, is a thumb screw threaded through a suitable opening vertically through the rear position of the body member 31 into pivoted engagement with bar element 18 extending the width of said body, and reciprocally moveable by means of the screw 17, in a slot 19 provided therefore in said body. Any conventional means of engagement between the bar element 18 and screw 17 may be employed which will permit adjustment of the body in reference to the pointer 6, as for example, a ball and socket joint indicated by the numeral 17a. If desired, a spirit level 20 may be provided in the upper surface of the body member, but is not absolutely essential.

In the form of the device as illustrated by Figs. 3 and 4, the body member 41 is formed separately from the base portion 42 and the two parts joined at their forward ends by means of a hinge joint 21 held by the hinge pin 21a, a stop member 33 being formed integrally with base portion 42 at the joint and depending therefrom. The rearward end of the body member is provided with a bead 41a adapted for engagement with a clasp member 42a on the base 42 whereby the parts may be held together when not in use. A coil spring 22, held in the hinge joint by means of the hinge pin 21a, is provided for the purpose of permitting leveling of the body member and reflector element by pressure exerted manually against the spring pressure, with the base portion 42 in position against an indicator element of the character described. The spring 22 may be adapted to exert such pressure against the parts 41 and 42, as by extended and opposed leg portions 22a and 22b. Also, other forms of deformable springs, such as commonly used for similar purposes may be substituted for the spring 22 illustrated. Where desired, the device as shown in Fig. 3 also may be provided with an adjusting screw member 17 threaded through the body member 41 into pivoted engagement with the base portion 42, as illustrated by Fig. 4, and as described with reference to Fig. 2. When the device is thus provided with an adjusting screw member, the bead 41a and clasp 42a may be omitted if desired.

Preferably, the body member of the viewer should be a solid member, but where desired it may be made hollow, as by casting, moulding, pressing or in any other manner, and from a variety of materials such as wood, metals, including sheet metals, plastics and the like. Also, although as in Fig. 2, the reflection element 14 may be directly mounted on the body member 31, separate means, such as a holder element 23 shown in Fig. 3, may be provided. By use of a separate element 23, the body member 41 may be made with a more uniform conformation, eliminating possible structural weakness or production difficulties.

In using the device described, the normal gauging operation is followed, except that instead of attempting a sight directly on the tube scale over the forward end of the pointer 6, that is along line a—b, the gauger places the present sighting device on the top surface of the pointer, and after aligning the device with the scale in the manner provided and as required, sights vertically downward, along the line y—x on the cross-hair 16 as aligned with cross-hair 15 to obtain the reading of the scale figure reflected by the mirrored base surface of the element 14, and intercepted by the cross-hair 16.

The invention has been described in conjunction with the accompanying drawings for the purpose of illustration only, and it is not intended that it shall be limited thereby, but only by the appended claims.

I claim:

1. In combination with a liquid level gauging device, including a vertical gauge tube, having a calibrated scale, and reciprocally movable through a fluid-tight gland in a housing therefor, and a fixed-level, horizontal pointer, having an indicating end adjacent the tube, mounted on said housing and establishing a substantially horizontal sighting plane with reference to the vertical tube scale, a device for viewing said scale, providing a line of sight in a vertical plane substantially parallel to said tube and intersecting said horizontal sighting plane, comprising a body member having a base portion and a forward end, said member adapted to be seated on said pointer with its base position in said horizontal plane and its forward end toward said tube, a stop member, dependent from the forward end of said base portion, to engage the indicating end of said pointer, a prismatic reflector element of right isoceles section mounted on the forward end of said base member with one side surface disposed for spaced parallel relation to said tube and extending downwardly through said horizontal sighting plane when the body is seated on said pointer, and the other side surface for right angular relation to said tube, aligned sighting indicia imposed on the respective side surface portions, with that in the vertical surface disposed for coincidence in said horizontal sighting plane, and means carried by said body portion for vertical adjustment thereof with reference to the pointer in order to establish the defined relation of said reflector to said tube.

2. A device according to claim 1, in which said body member base portion is a separate element substantially co-extensive with said member attached thereto by means of a spring hinged joint at the forward end of said body portion, said base portion adapted for arcuate movement toward and away from said body member about said hinged joint.

3. A device according to claim 2, in which the means carried by said body member for vertical adjustment thereof with reference to the pointer, is a thumb-screw element, extended vertically through an aperture therefor in said body member in threaded engagement therewith, said element having a lower end secured in pivoted engagement with said base portion, whereby said portion may be moved arcuately toward and away from said body member by threading said thumbscrew element into and out of the threaded aperture therefor.

HERBERT O. BAILEY.

REFERENCES CITED

The following references are of record in the file of this patent:

UNITED STATES PATENTS

| Number | Name | Date |
|---|---|---|
| 1,041,622 | Guilfoyle | Oct. 15, 1912 |
| 1,818,355 | Readeker | Aug. 11, 1931 |
| 2,147,156 | Geffcken et al. | Feb. 14, 1939 |
| 2,247,113 | Benford | June 24, 1941 |

FOREIGN PATENTS

| Number | Country | Date |
|---|---|---|
| 27,132 | Great Britain | Nov. 25, 1912 |
| 293,893 | Great Britain | July 11, 1928 |